United States Patent [19]
Ulrich et al.

[11] Patent Number: 5,809,110
[45] Date of Patent: Sep. 15, 1998

[54] TECHNIQUE OF CONTROLLING TELEPHONE CALLS

[75] Inventors: Mark Ulrich, New York, N.Y.; Prabhakar Chitrapu, Princeton, N.J.

[73] Assignee: Dialogic Corporation, Parsippany, N.J.

[21] Appl. No.: 594,411

[22] Filed: Jan. 31, 1996

[51] Int. Cl.⁶ .......................... H04M 1/24; H04M 11/00; H04J 1/16; H04B 3/46

[52] U.S. Cl. .................................. 379/30; 379/28; 379/1; 379/93.32; 379/93.33; 370/262; 375/225; 358/406; 371/5.5

[58] Field of Search ................................... 379/1–4, 8–10, 379/12, 13, 22, 23, 24, 27–30, 32, 34, 90, 93–94, 97, 98, 100, 133, 134, 140, 188, 189, 196–199, 377, 366, 90.01, 93.01, 93.08, 93.09, 100.01, 100.05, 100.06, 93.33, 93.22, 93.31, 93.26; 375/224, 225, 227, 219, 220, 221, 222; 370/241, 244, 248–250, 252, 253; 358/400, 415, 416, 436–439, 443, 44; 374/5.5; 455/33.1, 67.1, 67.7, 423, 127, 426, 425, 445

[56] References Cited

U.S. PATENT DOCUMENTS

| | | | |
|---|---|---|---|
| 3,962,546 | 6/1976 | Hashimoto | 379/28 |
| 5,050,004 | 9/1991 | Morton, Jr. | 358/405 |
| 5,134,708 | 7/1992 | Marui et al. | 455/67.7 |
| 5,276,529 | 1/1994 | Williams | 358/406 |
| 5,299,257 | 3/1994 | Fuller et al. | 379/1 |
| 5,319,702 | 6/1994 | Kitchin et al. | 379/189 |
| 5,524,122 | 6/1996 | Lepitre et al. | 375/222 |

*Primary Examiner*—Paul Loomis
*Attorney, Agent, or Firm*—Kaplan & Gilman, LLP

[57] ABSTRACT

An improved system for minimizing toll charges is disclosed wherein line quality is measured and a call is terminated if the line quality is not at an acceptable level to allow for the highest possible bit rates during data transfer or to guarantee a certain minimum degree of quality.

10 Claims, 2 Drawing Sheets

TECHNIQUE OF CONTROLLING TELEPHONE CALLS

TECHNICAL FIELD

This invention relates to telephony, and more particularly, to an improved technique of minimizing telephone charges when the telephone network is utilized to transmit large amounts of voice and/or data between remote sites or when the cost of connection is high, as for example, in international calls.

BACKGROUND OF THE INVENTION

In recent years, it has become more common to connect remotely located computers and other data processing devices via telecommunications lines. The voice processing and telephony fields have grown rapidly over the past few years, and the expansion of these fields is expected to continue. Additionally, use of the Internet has become quite popular recently, and the telephone network is often used in conjunction with the Internet to transmit large amounts of data or voice between remotely located computers.

Typically, the digital bits utilized by all modern day computers are transformed into some type of analog signal and transmitted over the telephone line. There are two issues of importance when utilizing the telephone network to convey digital information between remote computers. First, the system should ensure that the transmission quality is good enough such that a minimal amount of errors occur. Transmission errors result in either faulty data or requirements to retransmit the information.

Second, the information should be transmitted at as high a data rate as possible. The lower the transmission rate for the data, the more toll charges that will be incurred and the more costly data transfer will be.

It can be appreciated that the above two factors are, in some sense, competing interests. Specifically, lower transmission rates typically result in less errors. However, a lower transmission rate often results in higher costs.

Prior art systems attempted to reach a compromise between the above two competing factors. An example of one such system is described in U.S. Pat. No. 5,450,438 to Landry et al. In the Landry arrangement, communication begins at the highest permissible data rate. If the channel is degraded such that communications can not properly take place at this high data rate, then the data rate is "stepped down" until an acceptable error rate is achieved. A similar system is described in U.S. Pat. No. 5,241,565 issued to Kloc et. al.

Both the Kloc and Landry arrangements represent techniques for attempting to transmit at the highest bit rate possible while minimizing errors. Both arrangements involve measuring line quality and adjusting the bit rate in order to achieve a compromise between the two factors discussed above. Both arrangements slow down the bit rate as line quality degrades.

Each of the above prior art systems presumes that the transmission quality is limited to a given channel. However, none of the prior art takes into account that it may be possible to establish a better communication channel and thereby increase the bit rate. Such a step could greatly decrease the cost of transmission if the toll charges incurred are, for example, reduced by 30 or 40 percent.

An additional drawback of the prior art is that by the time these prior art arrangements ascertain that the transmission quality is poor, toll charges have already been incurred. Since all known prior techniques rely upon slowing down the baud rate as line quality decreases, there is a requirement that toll charges be incurred in order to measure line quality. Indeed, if the quality is so poor that transmission can not occur at all, the prior art systems will have to first incur toll charges and transmit information, only to ascertain that no information can be transmitted effectively. Obviously, such a system is wasteful. There exists no known technique of eliminating the need to incur toll charges simply to ascertain that the line quality is poor.

SUMMARY OF THE INVENTION

The above and other problems of the prior art are solved in accordance with the present invention which relates to a technique for minimizing transmission costs. In accordance with the invention, the transmission quality of the channel is measured both prior to and during call completion. If the transmission quality is such that a maximum or specified bit rate can not be achieved, the connection is ended and a new connection formed by redialing the same destination through the telephone network. Even though it may be possible to transmit at a lower bit rate, the call is nonetheless abandoned, it being more cost efficient to simply redial the desired number to obtain a higher quality channel.

The call may be tried numerous times until an acceptable channel is obtained that allows for the maximum or specified bit rate. If repeated calls do not result in any channel with a quality that allows the highest bit rate, than the call may be abandoned or the channel may be utilized at the lower quality.

DETAILED DESCRIPTION OF THE PREFERRED EMBODIMENT

Figure 1:
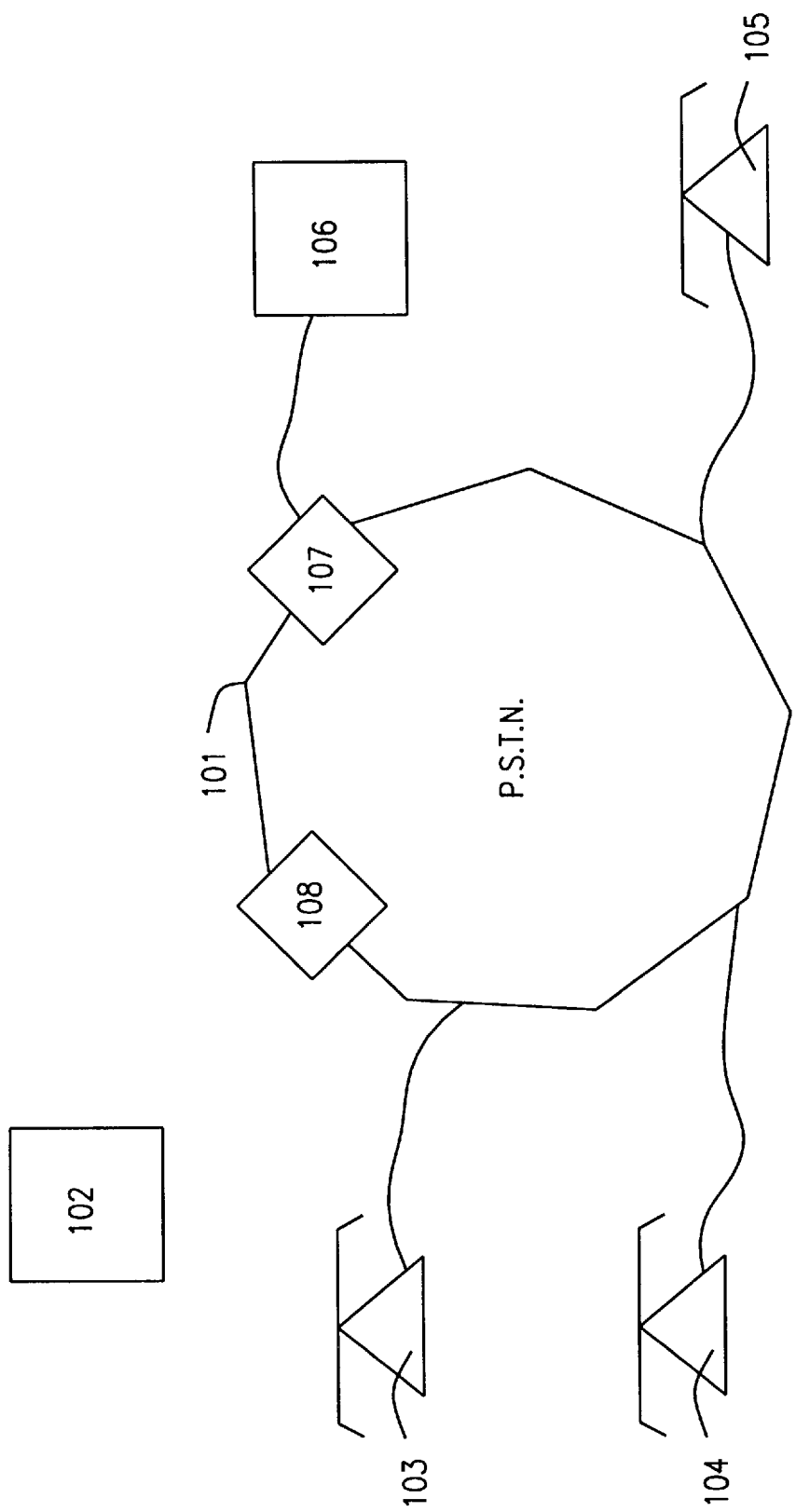
FIG. 1 shows a conceptual block diagram of the public switched telephone network (PSTN) including two computers 102 and 106 between which it is desired to transfer data.

FIG. 1 shows in conceptual form a representation of the public switched telephone network (PSTN) 101. The arrangement in FIG. 1 includes exemplary telephones 103 to 105, and two exemplary computers 102 and 106, all of which are interconnected by PSTN 101. Central office switches 107 and 108 represent the initial entry points into the PSTN 101 for computers 106 and 102 respectively.

When it is desirable to transmit a large amount of data from computer 102 to computer 106, computer 102 dials the telephone number associated with computer 106 and a connection is made through PSTN 101 linking computers 102 and 106. Thereafter, a modulation system is utilized whereby data from computer 102 is modulated into an analog signal and transmitted through PSTN 101 to computer 106.

In accordance with the invention, presuming that the telephone call was initiated by computer 102, computer 102 measures the line quality and ascertains whether or not it can support the prespecified bit rate. If not, computer 102 simply disconnects the telephone call and, after a predetermined delay, makes a different telephone call. In one embodiment of the invention, the line quality may be measured by utilizing the ring back tone generated from central office 107. In this manner, if the measurement shows a line quality which cannot support the specified bit rate, the call can be disconnected before computer 106 goes off hook, thereby eliminating all toll charges.

Figure 2:
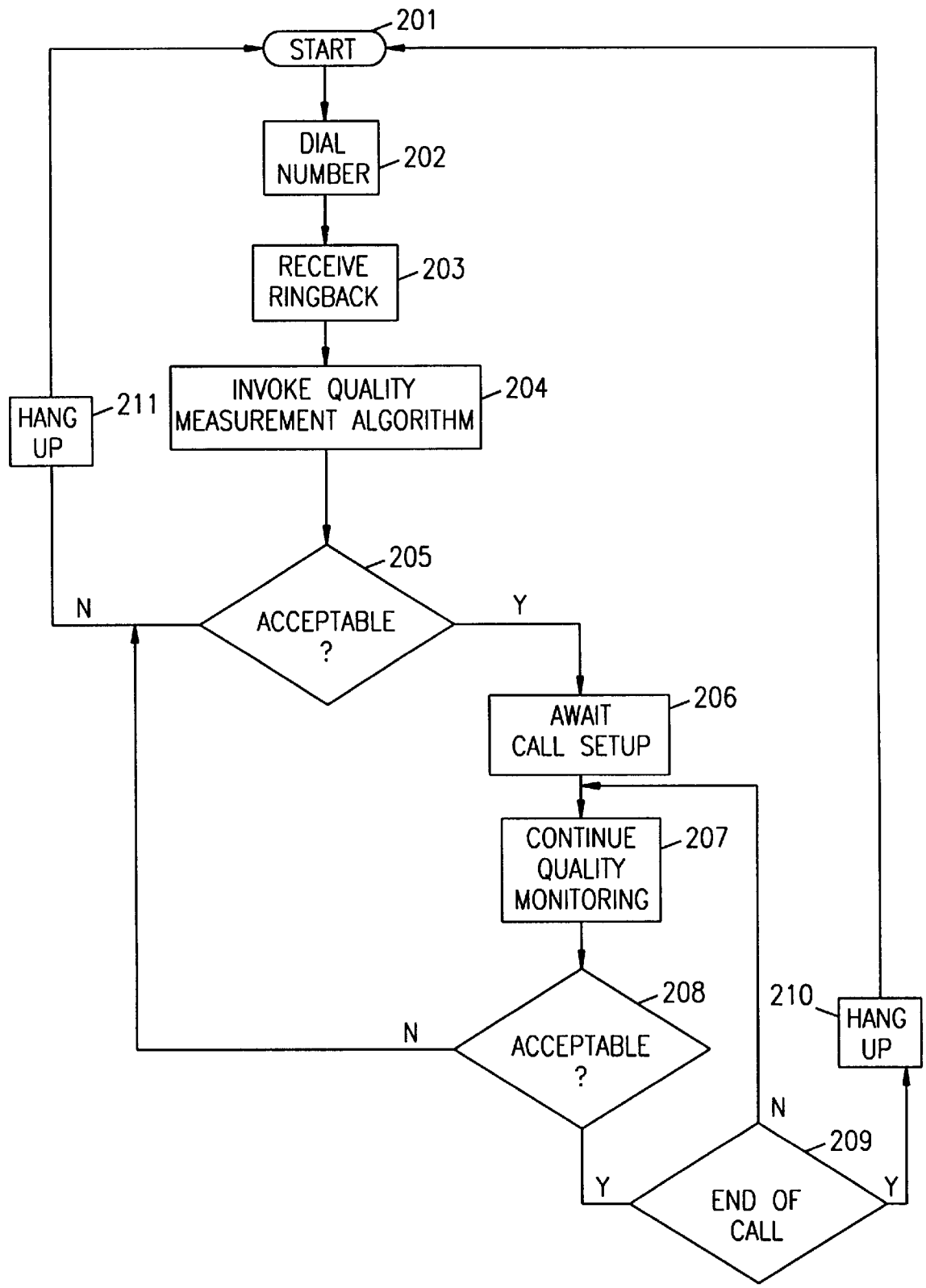
FIG. 2 is a flow chart illustrating an exemplary embodiment of the techniques of the present invention.

FIG. 2 shows a flow chart of the basic steps required to implement the inventive technique. The flow chart of FIG. 2 measures line quality both before and after the called party (i.e.; computer 106) goes off-hook. The arrangement in FIG. 2 is intended only to show the portion of the flow chart which is utilized for abandoning the call when the line quality is too low. Of course, any remaining software required for data transfer protocols, error checking, or other applications is not shown and is not critical to the present invention.

In operation, start block 201 initially transfers control to operational block 202 where the appropriate telephone number for computer 106 is dialed. The number may be prestored in memory or entered by a user of computer 102.

When a call is routed through PSTN 101 to central office 107, a ring back tone is generated which is transmitted back to computer 102. The ring back tone is received at operational block 203 and transferred to a quality measurement algorithm at block 204.

The quality measurement algorithm utilizes signal parameters such as signal to noise ratio, amplitude, etc. and outputs a value indicative of the overall quality of the line. The value may be in the form of a maximum available bit rate. Algorithms for calculating the maximum available bit rate are known in the art and have been used for quite some time.

At decision point 205, the algorithm determines whether or not the available bit rate is acceptable. The criteria for making such determination is preferably based upon a prestored desirable bit rate which has been entered by the user. Importantly, the prestored bit rate is usually larger than the minimum bit rate which may be utilized by computers 102 and 106. Accordingly, while computers 102 and 106 may in fact be able to transfer data between them at some minimum bit rate over the telephone lines, decision point 205 will nonetheless decide that the bit rate is unacceptable if it is too low. In this manner, the system will simply place another telephone call and get a higher quality connection, with a corresponding higher bit rate, rather than transmitting it at the lower bit rate.

Presuming the criteria are met such that the line quality is acceptable, control is transferred to operational block 206 where the system awaits call setup. Call setup involves the called party going off, and both computers 106 and 102 implementing a conventional handshaking protocol known to those of ordinary skill in the art.

After the call is setup and while the data transfer progresses, operational block 207 continues to monitor quality. Operational block 207 may be implemented such that quality measurements are taken every x units of time, where x is specified in advance. A typical value of x might be 30 seconds to one minute for voice calls, and 1–5 seconds for data calls. Thus, during the progress of the call, an interrupt can be generated every x units of time, and the quality measurement taken.

After each quality measurement is taken, decision point 208 determines whether the connection should be maintained. If, for example quality has degraded to the point where the bit rate would have to be slowed significantly, then decision point 208 would decide to no longer continue the connection.

Presuming that the quality has not so degraded, decision point 209 ensures that the call hasn't ended and transfers control back to block 207 to continue monitoring the call. If the call has ended, block 210 hangs up the telephone line and transfers control back to the beginning of the flow chart. Returning to decision point 208, if, at any time during the telephone call, the line quality drops below being acceptable, then the call may be ended at block 211 and reinitiated in order to continue the call. Of course, upon such reinitiation, computer 102 should only transmit the information which was not previously transmitted.

While the above describes the preferred embodiment of the invention, various modifications and/or additions would be apparent to those of ordinary skill in the art. For example, the continued monitoring of the telephone call after call setup and the monitoring of the ring back tone are both optional and may be used alone or in combination as described with respect to FIG. 2. Moreover the minimum quality and bit rate requirements may be different with respect to decision points 205 and 208. For example, while decision point 205 may require the highest quality line in order to initiate the call, decision point 208 may allow the line to degrade somewhat, albeit not entirely, before hanging up.

For example, consider that there are three possible bit rates high, medium, and low. Decision block 205 requires the highest bit rate to initiate the call. Once the call is in progress however, decision point 208 will allow the call to continue even if the line quality degrades to medium. If however, the line quality delays to low, then decision point 208 would disconnect the call and computer 102 would reinitiate a new call.

Additionally, decision point 208 could account for the remaining time in the call. For example, computer 102 would know what percentage of the call is complete. If the line quality degrades after 90 percent of the call is complete, then decision point 208 may simply allow the call to be completed at the lower line quality. If however, line quality degrades after only 10 percent of the call is complete, then decision point 208 may require that computer 102 hang up and initiate a new telephone call.

Other modifications and variations would be apparent to those of skill in the art.

We claim:

1. A method of completing a telephone call for the transfer of voice or data between data processing equipment, said data processing equipment having a plurality of possible transfer rates, one of which is a specified transmission rate, the method comprising the steps of:

a) measuring line quality to ascertain which of said plurality of transfer rates can be used at said measured line qualities;

b) disconnecting said call if said transmission rate is lower than specified transmission rate, even if said transmission rate is one of said possible transmission rates.

2. The method of claim 1 further comprising the step of placing a telephone call from a first data processing equipment to a second data processing equipment.

3. The method of claim 2 wherein said step of measuring occurs prior to said second data processing equipment causing said telephone call to be answered.

4. The method of claim 3 wherein said step of measuring occurs both prior to and subsequent to said second data processing equipment answering said telephone call.

5. A method of decreasing toll charges incurred in connection with voice or data transfer over a telephone network from a calling data processing equipment to a call data processing equipment, the method comprising the steps of:

a) measuring characteristics of signals received prior to a telephone call being answered;

b) preventing completion of said telephone call if said characteristics indicate that a line quality associated with said telephone call is below a predetermined threshold.

6. The method of claim 5 wherein said step of measuring comprises the step of analyzing a ringback signal to determine signal to noise ratio.

7. The method of claim 6 wherein said step of measuring comprises the step of determining echo characteristics.

8. The method of claim 7 wherein said step of measuring comprises the step of measuring signal level.

9. The method of claim 7, wherein said step of measuring comprises the step of determining delay characteristics.

10. A method of controlling a telephone call comprising the steps of:
(a) measuring characteristics of signals received after said call is initiated but prior to said call being completed; and
(b) disconnecting said call if said characteristics are not sufficient to support a predetermined quality level and completing said call otherwise.

* * * * *